US009659091B2

(12) United States Patent
Caruso et al.

(10) Patent No.: US 9,659,091 B2
(45) Date of Patent: May 23, 2017

(54) COMPARISON OF DATA SIGNALS USING CHARACTERISTIC ELECTRONIC THUMBPRINTS EXTRACTED THEREFROM

(71) Applicant: EXCALIBUR IP, LLC, Sunnyvale, CA (US)

(72) Inventors: Jeffrey L. Caruso, Carlisle, MA (US); Nicholas Seet, Los Angeles, CA (US); William Shawn Yeager, Carlsbad, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 330 days.

(21) Appl. No.: 14/071,050

(22) Filed: Nov. 4, 2013

(65) Prior Publication Data

US 2014/0058706 A1    Feb. 27, 2014

Related U.S. Application Data

(63) Continuation of application No. 13/619,694, filed on Sep. 14, 2012, now Pat. No. 8,620,626, which is a continuation of application No. 13/438,468, filed on Apr. 3, 2012, now Pat. No. 8,392,148, which is a continuation of application No. 12/956,493, filed on Nov. 30, 2010, now Pat. No. 8,160,840, which is a continuation of application No. 12/183,824, filed on Jul. 31, 2008, now Pat. No. 7,853,438, which is a continuation of application No. 10/132,091, filed on Apr. 24, 2002, now Pat. No. 7,421,376.

(60) Provisional application No. 60/285,949, filed on Apr. 24, 2001.

(51) Int. Cl.
*H03F 1/26* (2006.01)
*G06F 17/30* (2006.01)

(52) U.S. Cl.
CPC .. *G06F 17/30743* (2013.01); *G06F 17/30758* (2013.01); *G10H 2210/031* (2013.01); *G10H 2240/141* (2013.01)

(58) Field of Classification Search
CPC .... G06K 9/624; H03H 21/0012; G06F 17/18; G01B 11/24; G01R 23/167; G01R 13/00
USPC .................... 702/66, 70, 189, 190
See application file for complete search history.

(56) References Cited

U.S. PATENT DOCUMENTS 6,990,453 B2 * 1/2006 Wang et al. ................. 704/270
7,421,376 B1 * 9/2008 Caruso et al. ............... 702/190
8,620,626 B2 * 12/2013 Caruso et al. ............... 702/189

* cited by examiner

*Primary Examiner* — Lam Nguyen
(74) *Attorney, Agent, or Firm* — James J. DeCarlo; Greenberg Traurig, LLP

(57) ABSTRACT

A characteristic thumbprint is extracted from a data signal, the thumbprint based on statistics relating to the data signal. The data signal can be compared indirectly by matching this thumbprint against one or more reference thumbprints. The data signal may be any type of signal, including streaming digitized audio or obtained from static files. A database may contain a number of these characteristic thumbprints, and the database can be searched for a particular thumbprint.

20 Claims, 3 Drawing Sheets

COMPARISON OF DATA SIGNALS USING CHARACTERISTIC ELECTRONIC THUMBPRINTS EXTRACTED THEREFROM

CROSS REFERENCE TO RELATED APPLICATIONS

This application is a continuation of and claims the benefit of U.S. patent application Ser. No. 13/619,694, filed Sep. 14, 2012, which is a continuation of and claims the benefit of U.S. patent application Ser. No. 13/438,468, filed Apr. 3, 2012, now U.S. Pat. No. 8,392,148, which is a continuation of and claims the benefit of U.S. patent application Ser. No. 12/956,493, filed Nov. 30, 2010, now U.S. Pat. No. 8,160,840, which is a continuation of and claims the benefit of U.S. application Ser. No. 12/183,824, filed Jul. 31, 2008, now U.S. Pat. No. 7,853,438, which is a continuation of and claims the benefit of U.S. application Ser. No. 10/132,091, filed Apr. 24, 2002, now U.S. Pat. No. 7,421,376, which claims the benefit of U.S. Provisional Application No. 60/285,949, filed Apr. 24, 2001, each of which is hereby incorporated by reference in its entirety.

BACKGROUND

The present invention relates generally to the extraction of a characteristic thumbprint from a data signal, such as an audio data file, and further to the comparison or matching of such thumbprints.

Because of the variations in file formats, compression technologies, and other methods of representing data, the problem of identifying a data signal or comparing it to others raises significant technical difficulties. For example, in the case of digital music files on a computer, there are many formats for encoding and compressing the songs. In addition, the songs are often sampled into digital form at different data rates and have slightly different characteristics. These minor differences make direct comparison of such files a poor choice for efficient file or signal recognition or comparison. Direct file comparison also does not allow comparison of media encoded in different formats (e.g., comparing the same song encoded in MP3 and WAV).

For these reasons, identifying and tracking media and other content, such as that distributed over the Internet, is often done by attaching metadata, watermarks, or some other code that contains identification information for the media. However, this attached information is often incomplete, incorrect, or both. For example, metadata is rarely complete, and filenames are even more rarely uniform. In addition, approaches such as watermarking are invasive, altering the original file with the added data or code. Another drawback of these approaches is that they are vulnerable to tampering. Even if every media file were to include accurate identification data such as metadata or a watermark, the files could be "unlocked" (and thus pirated) if the information were successfully removed.

Accordingly, other methods have been developed based on the concept of analyzing the content of a data signal itself. These method, however, fail because of their significant limitations and lack of robustness. Moreover, many of these techniques rely on knowing the beginning and ending of a signal. As a result, they cannot identify a signal whose beginning and end points are not defined, as in the case of streaming media provided over a broadcast network like the Internet. However, signal identification in streaming media is very desirable, for example, to independently determine which audio data files have been broadcast over the Internet.

One example of a content-based approach, U.S. Pat. No. 5,918,223, issued Jun. 29, 1999, entitled "Method and article of manufacture for content-based analysis, storage, retrieval, and segmentation of audio information," describes a method for identifying "sounds" that fit a particular set of attributes (e.g., sounds that are "scratchy" versus sounds that are "bright"). This technique is adapted it for use in song recognition applications, but the algorithm does not allow for the identification of streaming signal sources, nor does the algorithm work with other types of data signals apart from audio. Moreover, the algorithm described in the '223 patent generates large 1000-character thumbprints that are not well suited to client/server applications and other large volume applications. Lastly, the algorithm relies on the Fast Fourier Transform (FFT) to process the audio signals, a process that is resource-intensive and is thus not very efficient.

Accordingly, there exists a need to overcome existing limitations that current signal recognition techniques have failed to solve.

SUMMARY OF THE INVENTION

Accordingly, the present invention enables a characteristic thumbprint to be extracted from a data signal based on the content of that signal. This thumbprint can be matched against a set of reference thumbprints to determine the identity of the signal or the similarity between two signals. Because of the nature of the thumbprint extraction algorithm, the present invention does not suffer from many of the problems that plague existing solutions, and as compared to such solutions, the present invention is fast, efficient, highly accurate, scalable, and robust.

In a first embodiment, the method includes extracting a characteristic statistical thumbprint from at least a portion of a data signal at a particular point in time. One of a number of embodiments for extracting a thumbprint includes passing the signal in parallel fashion through a number of bandpass filters. For each filtered signal, a set of power statistics are computed. Then, a set of statistical metrics is computed based on these power statistics. In one embodiment, these power statistics include the root-mean-square of the signal amplitude for a segment of the signal, and the set of statistical metrics includes a ratio of the standard deviation to the mean for the power statistics for each of the filtered signals. The thumbprint is constructed from the set of statistical metrics, which provide the variance of the data signal within each of a set of frequency bands. Therefore, closely matching signals sampled at corresponding points in time will result in thumbprints that are close to each other or are the same. Thumbprints can be stored as vectors of the statistics, allowing for vector-based operations for comparison.

In addition, one contemplated aspect of the invention is the thumbprint itself, stored on a computer readable medium or fixed momentarily as a transmissible signal. Because the thumbprint is based on statistics relating to the frequency information of the corresponding signal, the present methods works on any kind of digital file format or analog signal. In one embodiment, one or more thumbprints are stored on a computer-readable medium and are capable of being used with the methods described herein. In another embodiment, one or more thumbprints are represented in a computer-transmissible signal over a computer or other communications network. Thumbprints according to a preferred embodiment of the invention are not derivative works under the copyright laws; therefore, they can be freely made and shared without anyone's consent. This makes such thumbprints particularly useful where the data signals represent copyrightable subject matter.

In another aspect, an embodiment includes a method for efficiently extracting a series of thumbprints from a test signal such that at least one will match closely with one or more previously extracted thumbprints.

In a preferred embodiment, the thumbprint is extracted without performing an FFT. Instead, the signal is passed through a set of filters, which is a much less computationally intensive approach and thus more efficient. Moreover, the generation of the thumbprints can be performed on streaming or static data sources.

In another aspect, an embodiment includes a database for storing a large number of thumbprints and a method for constructing the database. The database stores a large number of thumbprints in a tree structure, wherein nodes contain a set of thumbprints or pointers to additional nodes. In an embodiment, the nodes are indexed by a particular dimension of the thumbprints contained therein.

In an embodiment for attempting to match a test thumbprint with the database, the test thumbprint can be found rapidly if it is among the stored thumbprints due to the nature of the database. Because of this indexing scheme, choosing branches in the tree to search for a test thumbprint is based on the value of the thumbprint's coordinate in the indexed dimension. The database allows for rapid and efficient matching of thumbprints because it does not require a test thumbprint to be matched against every other thumbprint in the database. Rather, through a network of decision nodes, the database's tree structure drastically reduces the number of actual thumbprint comparisons that must be performed.

In a preferred embodiment, the data signal comprises a digitized time-dependent signal, such as an audio waveform. Applications of this technology are numerous, including, but not limited to, real-time identification of audio streams (streaming media, radio, advertisements, Internet broadcasts, etc.), songs (any music, CDs, MP3s, etc.), video (TV, movies, etc.), patterns (weather, astral, etc.), and text (characters, books, etc.) among types of static and dynamic data signals. The invention enables efficient real-time media content auditing and other reporting. Because of its efficiency and performance, the invention is well suited for client software applications, embedding into hardware or firmware in a device, and use with wireless devices and other devices having limited resources.

DETAILED DESCRIPTION OF THE PREFERRED EMBODIMENTS

The present invention enables the extraction of characteristic information—i.e., a thumbprint—from a data signal. The methods described herein are robust; hence, the data signal can be any data signal suitable for having characteristic information extracted therefrom. In a preferred embodiment, the data signal contains media data, such as a sound, music, a picture, animation, or a combination thereof. Although the inventive aspects described herein can be applied to any of a wide variety of data, the invention is particularly useful in connection with time-dependent signals or other signals that have relevant frequency characteristics. (As used herein, frequency can relate to time, distance, or any another suitable dimension.)

Figure 1:
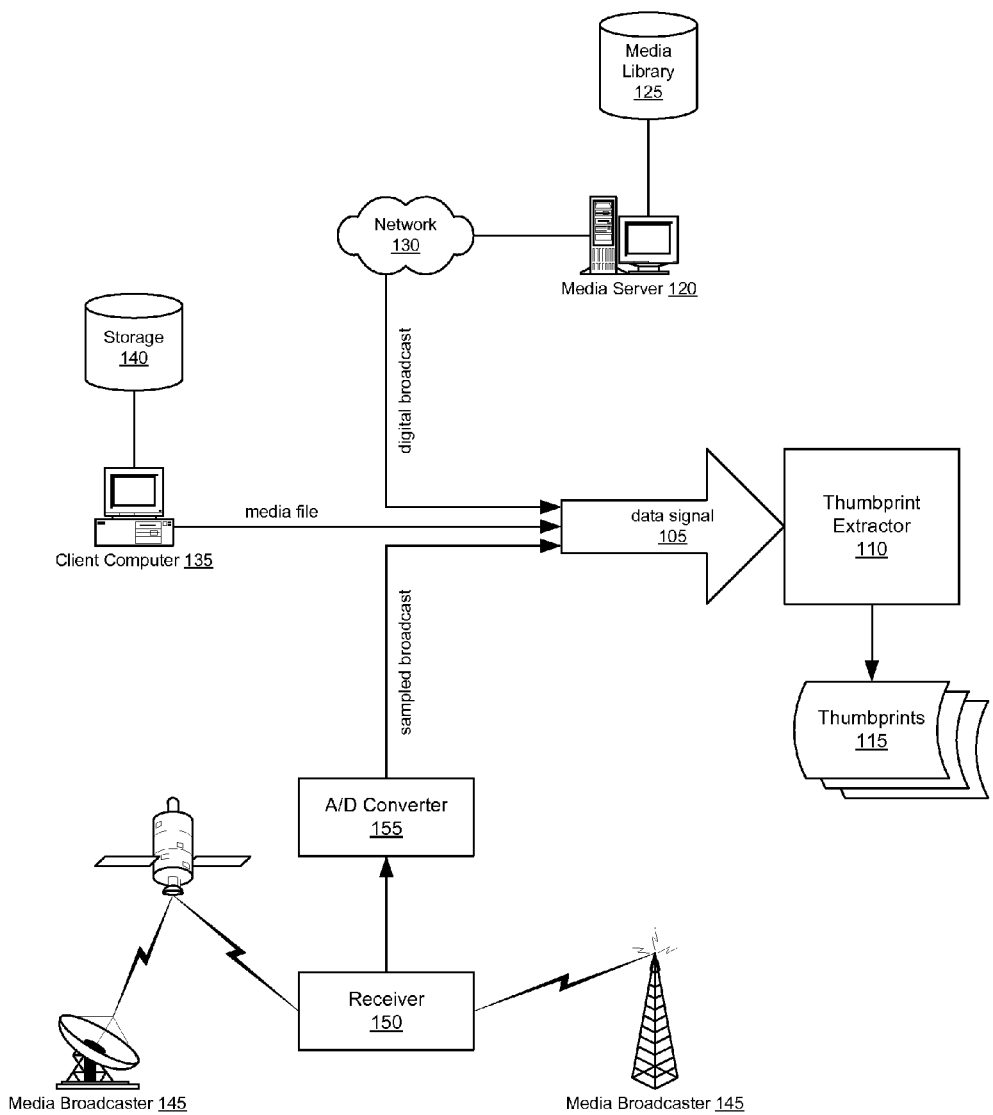
FIG. 1 is a diagram of different embodiments of a system for receiving a data signal and extracting a characteristic thumbprint therefrom.
Figure 2:
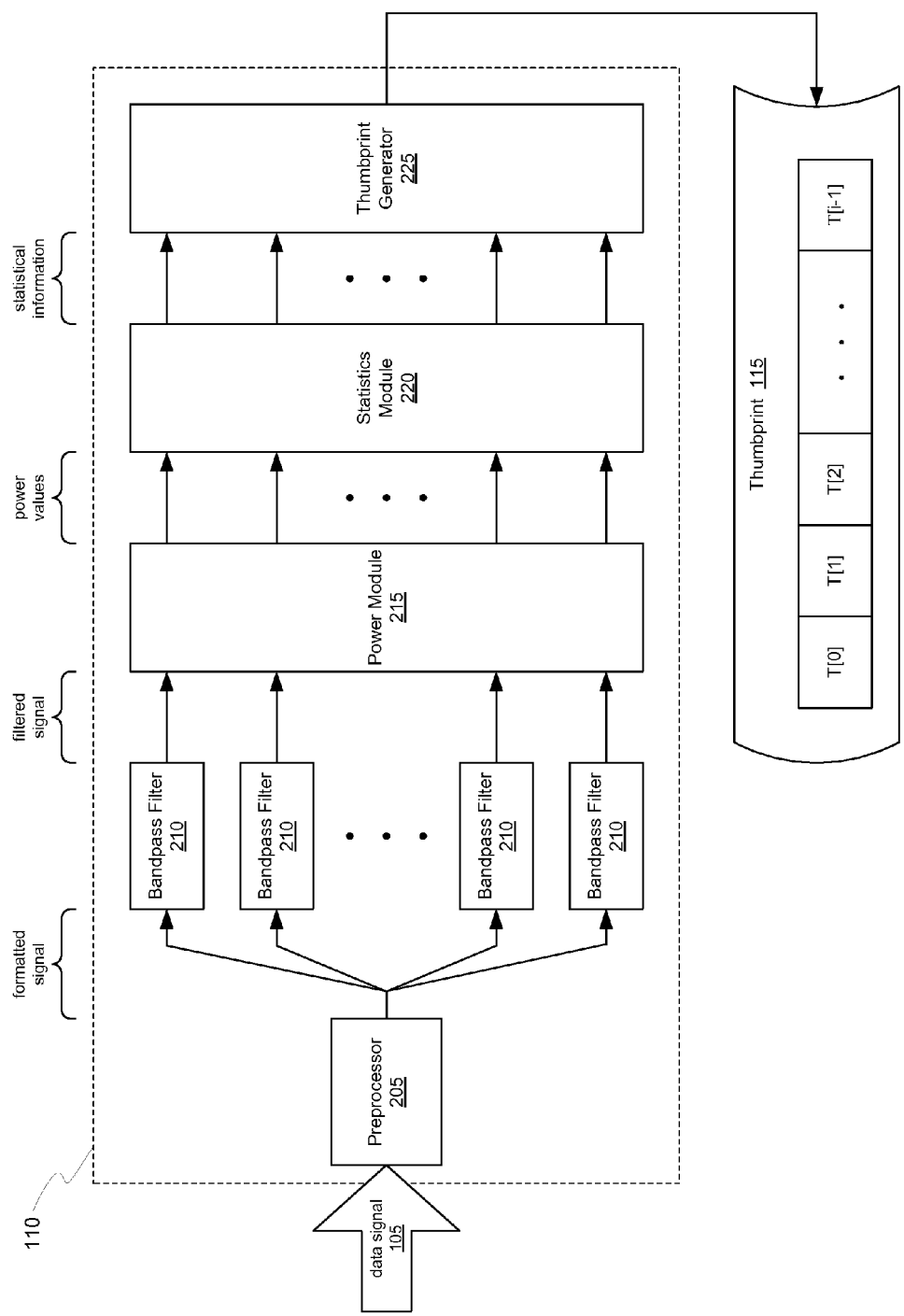
FIG. 2 is a diagram of a thumbprint extractor in accordance with one embodiment.

In FIG. 1, a thumbprint extractor 110 receives a data signal 105 from any of a wide variety of sources. Based on this data signal 105, the thumbprint extractor 110 generates one or more thumbprints 115 characteristic of the received signal 105. Serving as a unique identifier, a thumbprint provides information relating to the identity or other characteristics of the received data signal 105. In particular, the thumbprint allows the data signal to be uniquely identified. Embodiments for thumbprint extraction are described in detail below. The extracted thumbprint 115 is then used in a further process or stored on a medium for later use. For example, the thumbprint 115 can be compared against other thumbprints (not shown) to determine the identity of the data signal 105. Various methods for using the thumbprints are also described below.

Several different configurations for receiving the data signal 105 by the thumbprint extractor 110 are contemplated, some examples of which are illustrated in FIG. 1. In one embodiment, a media server 120 is coupled to a media library 125. The media server 120 retrieves media files from the media server 125 and transmits a digital broadcast to the thumbprint extractor 110 over network 130. In one embodiment, network 130 includes the Internet. The digital broadcast is often determined by a playlist maintained by or accessible to the media server 120. A streaming Internet radio broadcast is one example of this type of embodiment. In such an embodiment, the thumbprint extractor 110 usually does not have any information regarding the beginning or ending times of individual media items contained within the streaming content of the data signal 105. This embodiment is also a common method for delivering other types of media, advertisements, and other contents to one or a group of users.

In another embodiment, the thumbprint extractor is coupled to a client computer 135, which has access to a storage 140 containing data files, such as media files. The client computer 135 retrieves an individual file from storage 140 and sends the file to the thumbprint extractor 110 for generating one or more thumbprints 115 of the file. Alternatively, the computer 135 retrieves a batch of files from storage 140 and sends them sequentially to the thumbprint extractor 110 for generating a set of thumbprints for each file. (As used herein, "set" is understood to include any number of items in a grouping, including a single item.) In one embodiment the thumbprint extractor 110 is a software program residing on the computer 135, and in another embodiment it is maintained on a remote server coupled to the client computer 135 over a network.

In yet another embodiment, the data signal 105 comprises a sampled broadcast. In this embodiment, a media broadcaster 145 transmits media in an analog signal, which is received by a receiver 150. The receiver is coupled to an analog to digital (A/D) converter 155, which samples the analog broadcast and converts it into a digital form for being processed by the thumbprint extractor 110. In an alternative embodiment, the media broadcaster 145 transmits the data in digital form, obviating the need for an A/D converter 155. Types of media broadcasters 145 include radio transmitters, satellite transmitters, and cable operators. In this embodiment, the thumbprint extractor 110 is used to audit the broadcasters in order to determine which media files are broadcast at which times, in order to ensure compliance with broadcasting restrictions, licensing agreements, and the like. Because the extractor 110 operates without having to know the precise beginning and ending of the broadcast signals (which are being streamed), it can operate without the cooperation or knowledge of a media broadcaster 145, and thereby ensure independent and unbiased results.

Extraction of a Thumbprint

For illustration purposes, and not by way of limitation, thumbprint extraction methods are described in terms of extracting a thumbprint from an audio data signal. However, it is understood that any signal dependant on time or another dimension can be processed in accordance with embodiments described herein. The functions described below can be programmed in a digital computer or other digital device by well known techniques. In addition, although the methods are described in terms of processing of digital signals, it is within the ability of one skilled in the art to construct an analog system in accordance with these embodiments.

The data signal 105 is received by a preprocessor 205, which formats the data into the form of a sampled analog signal for use with the thumbprint extraction algorithm. In one embodiment, the preprocessor 205 performs any decompression or other data conversion steps that are required. For example, if the data received is in the popular MP3 format, the preprocessor 205 decompresses the audio file into a series of samples that represent the audio signal. Preferably, the preprocessor 205 is adapted to recognize multiple data formats and format the data accordingly. Such recognition techniques are well known in the art, and include reading header information in the received data file.

In the example of an audio file, the original signal is sampled to a predetermined rate. In one embodiment (and in the example herein described), the sample rate is 44.1 kHz. If the original signal is lower than the 44.1-kHz sample rate, the signal is upsampled—i.e., additional samples are added to the original signal to create a 44.1-kHz signal. Samples can be added to the original signal by linear interpolation or any other desired technique. If the original signal is sampled at a higher rate than 44.1 kHz, the signal is downsampled as needed.

The preprocessor 205 is further adapted to linearly scale the amplitude of the original signal to a predetermined range. In one embodiment (and in the example herein described), this range is selected to be the integer range from −32767 to 32767. By selecting this range, each sample of the normalized signal can be represented by a 16-bit binary number. The signal may be scaled by the maximum possible amplitude, for example, essentially $2^N$, where N is the width in bits of the output of the A/D converter 155. The precise scaling factor is unimportant because of later normalization when the thumbprint is created. As a practical matter, most digital audio on the Internet is in 16-bit form. For other applications, it might be desirable to use either a linear or a logarithmic transformation to normalize the signal.

Once the signal is normalized, it is sent in parallel to a plurality of bandpass filters 210. The number of bandpass filters 210 used is a design parameter selectable by the designer; however, for purposes of this discussion, twelve bandpass filters 210 are described. An effective frequency range for the signal is divided into twelve distinct frequency bands, and each digital bandpass filter 210 is constructed to have its critical frequencies equal to the low and high frequencies of a corresponding one of these twelve frequency bands. In an embodiment where the signal represents an audio signal, the effective frequency range is selected to be within the audible range, about 200 to 20,000 Hz. Although the audible range extends as low as around 20 Hz, 200 Hz is preferably selected as the lower end of the range in an audio signal embodiment. This is preferred because audio signals that differ tend to differ more widely in the range 200 to 20,000 Hz than in the entire audible range that includes the lower frequencies (e.g., 20 to 200 Hz). In a preferred embodiment, the frequency bands are selected between this range of 200 and 20,000 Hz and are chosen in a logarithmically even fashion. In a preferred embodiment, the frequency bands do not overlap. In other embodiments, depending on the type of signal, other "frequency" ranges, numbers of bandpass filters, and frequency band allocations among the filters can be selected.

In one embodiment, each bandpass filter 210 comprises a cascade of a low-pass Chebysheff filter and a high-pass Chebysheff filter, the Chebysheff filters having two, four, or six poles. Preferably, the lower frequency filters are selected to have fewer poles for stability, and the higher frequency filters are selected to have more poles to achieve a sharp cutoff in their frequency response. In one aspect of a preferred embodiment, the bandpass filters 210 do not perform an FFT on the data samples. By avoiding use of an FFT, a preferred embodiment uses less system resources and is thus faster and more efficient.

Starting at a particular point in time, which may be arbitrarily chosen, the digitized signal is passed through each of the twelve bandpass filters 210 in parallel, resulting in a set of twelve filtered signals. Preferably, the first 0.05 seconds (or 2,205 samples, at this sample rate) of each of the twelve filtered signals is discarded. This 0.05-second period accounts for the rise time of the bandpass filters 210, wherein the twelve signals may not be effectively filtered within their corresponding frequency bands. Depending on the system parameters and selection of filters, this time period may be adjusted or eliminated.

Each parallel filtered signal is then scanned for a local peak by a power module 215. In one embodiment, the local peak is defined as the maximum absolute value of the signal's amplitude within a selected interval (e.g., one-third of a second) around a peak. In this way, the system scans backward and forward over the period to search of the local peak, to avoid missing the peak. In another embodiment, peaks are located by looking at the average total power calculated for a series of short sample periods (e.g., 0.01 seconds) and looking for peaks among these periods. Other methods for locating local peaks in each frequency band can be selected depending on the application.

Once a peak is located, the power module stores the absolute value of the amplitude of the peak and the location of the peak. Starting at the initial peak of each filtered signal, the filtered signal is divided into segments. In one embodiment, and for explanation purposes, the segment size is selected to be 0.05 seconds, or 2,205 samples. However, persons skilled in the art will recognize that his is a mere design parameter, which can be adjusted for various applications without departing from the invention. In some embodiments, location of local peaks is a method of beat tracking, wherein the tracked series of beat points is stable under various digital-to-analog or decompression conversion methods. This holds regardless of whether the beat tracking matches a human's intuitive notion of beat.

The power module 215 then computes a value relating to a measure of the filtered signal's power within each particular segment for a series of segments in each frequency band. In one embodiment, this computed power metric is the root-mean-square (RMS) of the amplitude of the 2,205 samples in each segment. The RMS amplitude can be calculated by the equation:

$$P = \sqrt{\frac{\sum_{i=1}^{N}(a_i)^2}{N}},$$

where P is the computed power metric; N is the number of samples (2,205 in the present example); and $a_i$ is the amplitude of the $i^{th}$ sample. These calculated values of power for each frequency band are transmitted to a statistics module 220.

Once the power (RMS amplitude) values have been computed for the a given number of segments in each frequency band, the statistics module 220 computes statistical information relating to the power values for each frequency band. In one embodiment, 400 segments of 0.05-second segments are used to compute the thumbprint. In one embodiment, this statistical information comprises a normalized ratio of the standard deviation to the mean of the power values of each frequency band. To perform this calculation, the statistics module 220 first computes the mean and standard deviation of the power values for each frequency band. The mean, μ, and standard deviation, σ, are given by the equations:

$$\mu = \frac{\sum_{m=1}^{M} P_m}{M}$$

and $$\sigma = \sqrt{\frac{\sum_{m=1}^{M}(P_m - \mu)^2}{M-1}}.$$

where $P_m$ is the computed power value of the $m^{th}$ segment, and M is the number of segments.

The statistics module 220 then divides the computed standard deviation, σ, by the computed mean, μ, for each frequency band. This quotient is then normalized to an integer scale of 0 to 65534, wherein 32767 corresponds to a value of σ/μ=1.0, and values above 2.0 are truncated to 2.0. In a preferred embodiment, this normalization is linearly determined.

The power module 215 and/or the statistics module 220 can be implemented as a single module, or as distinct modules for each frequency band.

A thumbprint generator 225 is coupled to the statistics module 220. The thumbprint generator is configured to generate thumbprint data corresponding to the statistical information calculated for the signal in each of the frequency bands. The characteristic thumbprint for the signal is derived from this statistical information, which is related to the power values computed for each frequency band. Basically, this information contained in the thumbprint is a measure of the variance within each of a set of frequency bands. With audio signals for example, is has been shown that the variance within each of a set of frequency bands is a robust measure and one of the more perceptually distinctive features. In one implementation, the thumbprint is defined to be the ordered 12-tuple of the normalized integer values for the ratio of the standard deviation to the mean of the power values of each frequency band. In this case, a thumbprint comprises a series of twelve 2-byte coordinate values, designated T[0], T[1], . . . , T[11]. Because of the normalization scheme described above where each quotient is a 16-bit (2-byte) integer, this thumbprint can be stored in a computer memory using 24 bytes of storage. This storage format is considerably more efficient than the typical format employed by conventional methods, which can require thousands of characters. As a result, it allows for very efficient and fast storage and comparison of thumbprints.

In the embodiment described above, the extraction of the characteristic information is performed in a digital environment. However, those of ordinary skill in the art can appreciate that the same or similar processes could be performed in other ways, such as by an analog circuit. In an analog implementation, the thumbprint extractor 110 comprises analog components for performing the data processing steps described above in connection with the digital embodiment. Such components, including bandpass filters and calculation circuitry, are commonly known in the art.

In another embodiment of the thumbprint extraction method, the power module 215 does not scan each parallel filtered signal for a local peak. Instead, the power module 215 divides the filtered signal into 401 consecutive 0.05-second segments, starting at the original given point in time. The power module 215 computes the maximum absolute amplitude in each segment. With this information, it is easy to determine which of the segments contained the initial peak and compute the statistics for 401 segments starting with that peak segment. Contrasted with the embodiment described above where the system scans backward and forward over 14,700 samples (one third of a second of samples) to compare amplitudes of each sample, this embodiment need only scan about 7 segments (about one third of a second of segments) to compare their maximums and find a peak. This may not result in exactly the same peaks as the earlier method, but it does give a reasonably stable answer. This embodiment may be termed the approximation method.

Yet another embodiment of the thumbprint extraction method is called the "leaf-rake" method. In this method, the filtered signals are divided into segments, and a local peak is located, e.g., as described above. The first 400 segments in each frequency band are considered, and 32 of the 400 segments are chosen. This choice is made according to a sequence of 32 pairs of values for (1) time/segments past the local peak and (2) frequency band. These values are fixed but arbitrarily chosen by the designer. The computed power value of each of these 32 segments is then arranged in a 32-value vector, and this vector is normalized by (1) translating so that the average of the values is zero, and (2) scaling linearly so that the sum of the squares of the values is one. This resulting normalized vector is taken to be the thumbprint. A useful observation is that the dot product of any two such thumbprint vectors is precisely the correlation coefficient of the un-normalized computed power values. In addition, the square of the Euclidean distance between the two vectors is the two minus twice the correlation coefficient. Therefore, the Euclidean distance, which is useful for distance measures within a database, becomes a function of the correlation coefficient due to the normalization scheme described.

In empirical studies, it has been found that the portion of a song from 40 to 70 seconds into the song is typically the most "stable" portion of the song in terms of the thumbprint extraction techniques described. This can be explained by observing that during this time period in a typical song, most or all of the instruments have come into the song, any voices have been introduced, and the initial building of the song is completed. Therefore, in cases where the signal is a song or other audio signal and its start and stop times are known (e.g., the signal comes from an MP3 file), thumbprints are preferably taken from the song or audio signal within this "stable" range.

In some cases, it is desirable to extract a series of thumbprints for a data signal, including overlapping thumbprints. For example, the present invention is particularly well suited to the identification of streaming data files, such as streaming audio over networks such the Internet. For example, it may be desired to compare a received data signal to a canonical database of thumbprints that relate to known data signals (methods for which are described below). This situation might arise where streaming media is received (i.e., the starting and ending times of individual media items are not known), and one desires to identify the particular media items contained in the stream by comparing thumbprints generated for the media against thumbprints in the canonical database. Because the thumbprints to be compared preferably represent the same portion of a data signal, a series of thumbprints of the received data signal are generated. (This problem, of course, is not presented when comparing files of known start and stop times, as a predetermined thumbprint position can be selected.)

A series of overlapping thumbprints can be generated using one of the embodiments described above. If the approximation method is used, successive signals can be processed rapidly by retaining the RMS amplitude computations for every segment in each frequency band, determining the next local peak after the original local peak, and computing the additional segments needed to compute the approximate characteristic starting at the second peak (typically six to seven segments). This can be iterated for as long as the signal lasts, or until a match is found.

Matching a Thumbprint

As explained above, the thumbprint extracted from a first data signal can be compared against one or more thumbprints extracted from other reference data signals. If the thumbprints match, this is an indication that the first data signal is the same as the corresponding reference data signal. For example, a thumbprint is extracted from an unknown audio file, which is then compared against a database of reference thumbprints extracted from known songs. If the thumbprint matches a reference thumbprint, the unknown audio file is likely to be the same song as the one from which the matched thumbprint was extracted. This method can be used to determine the identity of the unknown data signal even if the songs corresponding to the two matched thumbprints are in a different file format or have a different sample rate.

In one embodiment, two thumbprints match if they are identical. Accordingly, two thumbprints can be compared bit by bit to determine the occurrence of a match. In another embodiment, a predetermined tolerance is incorporated to account for minor variations in source data signals. For example, certain compression schemes and round-off errors may cause thumbprints of the "same" data signal to have slightly different thumbprints. Therefore, two thumbprints match in this embodiment if their component statistical measures are within a predetermined Euclidean distance, which is a design parameter that can be varied according to an application's tolerance for false positives versus false negatives.

In another embodiment, a database is provided for comparing the thumbprint to a large number of reference thumbprints. The database allows the matching of small, generated thumbprints against a canonical library, which enables very fast thumbprint matching. Because the number of reference thumbprints can be very large depending on the application (e.g., tens of millions of thumbprints), it may be impractical to compare a test thumbprint against all thumbprints in a database. Accordingly, in one embodiment a database of thumbprints is constructed as a tree structure, containing "Leaf" and "Non-Leaf" nodes. A specific embodiment of the tree structure and thumbprints are described in relation to selected parameters; however, it is within the scope of the ordinary skill in the art to vary these design parameters depending on the application and desired performance.

Figure 3:
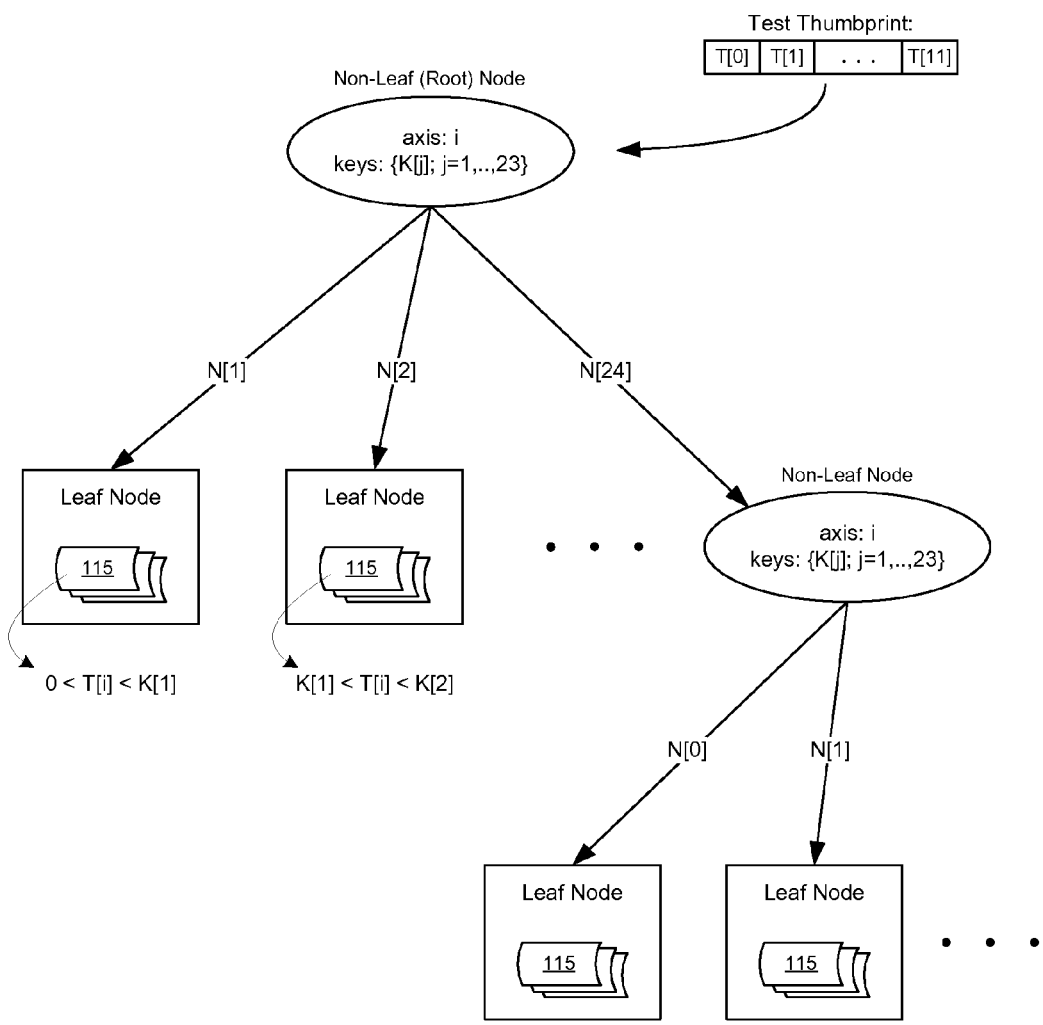
FIG. 3 is a diagram of a database for storing thumbprints in a tree structure, in accordance with an embodiment of the invention.

FIG. 3 shows a specific embodiment of the database in a tree structure. The starting point in the database is a root node. The database comprises Leaf nodes, which contain up to a predetermined maximum number of thumbprints, and Non-Leaf nodes, which point to subnodes (one or more Leaf or Non-Leaf nodes) further down the tree. Because of the maximum number of thumbprints allowed in a particular Leaf node, the tree structure contains more than the maximum number of thumbprints, there must be higher-level (Non-Leaf) nodes in the tree (i.e., the root node cannot be a Leaf node).

In one embodiment, a Leaf node represents between 1 and 2000 thumbprints, which may be stored in any order. Each Non-Leaf node contains an array of up to 24 pointers that point to subsidiary nodes, or subnodes, $\{N[j]; \text{for } j=1, \ldots, 24\}$ in the tree. Each of these subsidiary nodes may be a Leaf or a Non-Leaf node. Each Non-Leaf node also identifies an axis, i, which is an index from 0 to 11 (which corresponds to the twelve coordinates or tuples of a thumbprint) and a set of 23 keys $\{K[j]; j=1, \ldots, 23\}$, which are integer values between 0 and 65534. The axis, i, specifies the coordinate or tuple along which the thumbprints are separated by the Non-Leaf node. The keys specify the boundaries of the coordinate value by which the thumbprints are placed in the subnodes. For example, if i=3, the thumbprints are divided by their fourth coordinate, T[3]. Each thumbprint is thus located in a branch of the tree pointed to by the vector N[j], where j is determined by the keys between which the coordinate falls according the relationship:

$$K[j]<T[3]<K[j+1].$$

For example, the thumbprints in the first Leaf node in FIG. 3 share the property that their tuple T[i] has a value between 0 and the value of K[1].

Once the database is constructed, it can be searched for a match with a test thumbprint. As described above accordance with a thumbprint extraction algorithm, a test thumbprint comprises a series of twelve 2-byte coordinate values, herein designated T[0], T[1], ..., T[11]. A Leaf node is searched by comparing the test thumbprint against every thumbprint in the leaf and returning the closest match, if any is suitable. Searching a Non-Leaf for a test thumbprint requires that the proper next node path be determined. The direction of the next node down the tree structure to be searched is given by the pointer N[j], where the path j is determined by:

$$K[j]<T[i]<K[j+1],$$

where i is the Non-Leaf node's index value. Therefore, the Non-Leaf node's index value determines which of the thumbprint's dimensions by which the thumbprints are indexed by the keys, and the keys then determine which path should be taken to located the thumbprint. If T[i] is less than K[1] then node N[1] is searched, and if T[i] is greater than K[23] then N[24] is searched.

In another aspect of an embodiment, if a Non-Leaf search of a subsidiary node returns a thumbprint whose Euclidean distance from the test thumbprint is greater than the difference of N[i] and K[j], or the difference between N[i] and K[j+1], then the adjacent node or nodes (N[j−1] and/or N[j+1]) are searched as well. This avoids the error of missing a close match that lies just on the other side of a subnode boundary. However, the algorithm has to search down through two branches of the tree.

For optimal performance in one embodiment, the tree-structured database is balanced. In a balanced tree structure, the paths from the root node to any Leaf are the same distance or within 1 level of each other. This feature tends to make the time required to fully search the database consistent, avoiding particularly long times when the search algorithm would otherwise have to travel far down the tree structure. In another embodiment, the database is preferably spread as evenly as possible, so that small differences in the axis coordinate do not result in large differences in which subnode is selected.

In one embodiment for constructing a tree database, a list of thumbprints is obtained. First, a histogram is computed for each axis i. In one embodiment, there are twelve axes corresponding to the twelve coordinates, or characteristic values T[i]. Each histogram contains a count of the number of thumbprints that have a particular coordinate value, T[i], for each possible coordinate value, integers from 0 to 65534. Using these twelve histograms, for each axis the corresponding histogram is used to compute the values of the 23 keys that would split the thumbprints into 24 approximately equal sublists. In other words, the first key K[1] is selected to be larger than the coordinate values of one twenty-fourth of the thumbprints in the list, the second key K[2] is selected to be larger than two twenty-fourths of the thumbprints in the list, and so on. Accordingly, the keys are selected to equally divide the thumbprints according to a particular coordinate T[i], for each of the twelve histograms i=0, . . . , 11.

In the tree structure of an embodiment, the node can only be divided by one dimension, or axis. For each axis, the granularity is the smallest of the differences between two successive keys, between the largest key and 65534, or between the lowest key and 0. Accordingly, it is desirable to select the axis that provides the largest granularity, as determined by the keys computed above. Therefore, a root Non-Leaf node is constructed having an axis i set to the axis with the largest granularity and having keys {K[j]; j=1, . . . , 23} set to the 23 keys computed for that axis. The list of thumbprints is then split into 24 sublists according to the keys, i.e., thumbprints are grouped according to their coordinate T[i] between the boundaries defined by the keys. Pointers {N[j]; j=1, . . . , 24} are further added to the Non-Leaf node to point to each of the 24 subnodes. For each newly created subnode, if a subnode has fewer than 2000 thumbprints, the subnode is designated as a Leaf node and contains these thumbprints. Otherwise, if a newly created subnode has more than 2000 thumbprints, the subnode is designated as a Non-Leaf node. This Non-Leaf node, containing more than the predetermined maximum number of thumbprints, is further divided by recursively applying this algorithm until all nodes have been divided into Leaf nodes having fewer than the maximum of 2000 thumbprints therein.

The design parameters described above are by way of example only and can be varied without departing from the inventive concepts herein. For example, selecting the branching factor affects how wide and how deep the tree structure will be for a given amount of database entries. For the branching factor j=24, the database will not be too deep so that performance is substantially affected) if the database contains a few million thumbprints. Selecting the maximum number of thumbprints allowed in a Leaf affects the time that it takes to search a particular Leaf node. In additional, dividing the thumbprints at each Non-Leaf node by the axis that provides maximum granularity ensures that the coordinate chosen will give the greatest spread of values.

ADDITIONAL IMPROVEMENTS AND APPLICATIONS

In another embodiment, the accuracy of matching a test thumbprint to a reference thumbprint is improved by storing the relative start time of each thumbprint in the database. In this embodiment, a positive match is signaled only when two different sections of the signal match thumbprints in the database whose start times differ by the same (or within a selected interval) amount as the start times of the matched sections. Comparing data signals using multiple thumbprints and/or the absolute or relative position of one or more thumbprints in the signal drastically increases the accuracy of this method.

The embodiments described can be applied to a number of additional applications. For example, a computer program may use the thumbprint extraction and comparison algorithms described to identify digital media files, such as MP3 files. In the case of MP3 files, the determined identity of the song can be compared against a canonical database, which can be used to update or repair file information such as ID3 tags. In another embodiment, a client extracts a thumbprint from a digital signal (e.g., a media file) and sends the thumbprint to a server, the server compares the thumbprint against a database to determine its identity, and the server returns to the client information relating to the original signal.

In yet another embodiment, a software program residing on a computer monitors any audio sent to an audio output device. Upon detecting any playing of the media, the program extracts a thumbprint of the signal and logs the thumbprint or information relating to the signal derived from the thumbprint. This log can then be forwarded over a network to a server, which can then track the user's playing of the audio files, thereby allowing efficient and accurate billing to the user, for example, in a fee-based audio subscription system.

Similarly, the algorithms can be used to track advertisements or the like played on a computer. This enables efficient and accurate monitoring of a user's reception of such advertisements, allowing business models such as those involving compensating users for viewing the advertisements, or pricing advertisements to advertisers based on numbers of impressions.

Embodiments for identifying streaming media can be used to efficiently audit Internet radio stations or other media providers for compliance with licenses and royalties. Implemented on personal computers, the inventive techniques enable P2P license auditing and means for enforcing copyrights (e.g., by filtering out unlicensed media) while allowing the sharing of media and other copyrighted material.

In addition, the techniques described can be implemented in hardware or firmware, in addition to the software embodiments described. For example, code for performing the methods can be embedded in a hardware device, such as an MP3 player, for example in an ASIC or other custom circuitry. This combines the benefits of the invention with the capabilities of many different devices. In a hardware embodiment, portions or all of the methods can be performed by analog circuitry.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

What is claimed is:

1. A method comprising:
    filtering, by a computer processor, a data signal to produce a plurality of filtered signals, at least two of the filtered signals having a different frequency range;
    for each filtered signal in the plurality of filtered signals, scanning, by the computer processor, the each filtered signal for one or more peaks, each peak found from an average total power calculated for the each filtered signal for a series of sample periods;
    determining characteristic data for the data signal, by the computer processor, wherein the characteristic data for the data signal is determined based on the one or more peaks;
    extracting, by the computer processor, a digital thumbprint from the data signal based on content of the data signal, the digital thumbprint comprising the determined characteristic data for the data signal; and
    storing, by the computer processor, the digital thumbprint on a non-transitory computer-readable storage medium.

2. The method of claim 1, wherein the data signal contains encoded content from a group of encoded content consisting of encoded media content, encoded audio content, and encoded video content.

3. The method of claim 1, further comprising: receiving the data signal as streaming media over a network.

4. The method of claim 1, further comprising: receiving the data signal in real time over a network.

5. The method of claim 1, further comprising: sampling a broadcast signal to obtain the data signal.

6. The method of claim 1, wherein the plurality of filtered signals have frequency ranges that are in a logarithmically even fashion.

7. The method of claim 1, wherein each of the one or more peaks is defined as maximum absolute value of amplitude within an interval around the each of the one or more peaks.

8. The method of claim 1, further comprising calculating the average total power for the each filtered signal for the series of sample periods.

9. The method of claim 1, wherein the characteristic data for the data signal is determined using a statistical function comprising the ratio of the standard deviation to the mean of measures of power computed for the each filtered signal.

10. A system comprising:
    a processor;
    a storage medium for tangibly storing thereon program logic for execution by the processor, the program logic comprising:
        filtering logic executed by the processor for filtering a data signal to produce a plurality of filtered signals, at least two of the filtered signals having a different frequency range;
        scanning logic executed by the processor for scanning, for each filtered signal in the plurality of filtered signals, the each filtered signal for one or more peaks, each peak found from an average total power calculated for the each filtered signal for a series of sample periods;
        determining logic executed by the processor for determining characteristic data for the data signal, wherein the characteristic data for the data signal is determined based on the one or more peaks;
        extracting logic executed by the processor for extracting a digital thumbprint from the data signal based on content of the data signal, the digital thumbprint comprising the determined characteristic data for the data signal; and
        storing logic executed by the processor for storing the digital thumbprint on a non-transitory computer-readable storage medium.

11. The system of claim 10, wherein the data signal contains encoded content from a group of encoded content consisting of encoded media content, encoded audio content, and encoded video content.

12. The system of claim 10, further comprising: receiving logic executed by the processor for receiving the data signal as streaming media over a network.

13. The system of claim 10, further comprising: receiving logic executed by the processor for receiving the data signal in real time over a network.

14. The system of claim 10, further comprising: sampling logic executed by the processor for sampling a broadcast signal to obtain the data signal.

15. The system of claim 10, wherein the plurality of filtered signals have frequency ranges that are in a logarithmically even fashion.

16. The system of claim 10, wherein each of the one or more peaks is defined as maximum absolute value of amplitude within an interval around the each of the one or more peaks.

17. The system of claim 10, further comprising calculating logic executed by the processor for calculating the average total power for the each filtered signal for the series of sample periods.

18. The system of claim 10, wherein the characteristic data for the data signal is determined using a statistical function comprising the ratio of the standard deviation to the mean of measures of power computed for the each filtered signal.

19. A non-transitory computer readable storage medium comprising computer program code for execution by a processor, the computer program code comprising instructions for:
    filtering, by the processor, a data signal to produce a plurality of filtered signals, at least two of the filtered signals having a different frequency range;
    for each filtered signal in the plurality of filtered signals, scanning, by the processor, the each filtered signal for one or more peaks, each peak found from an average total power calculated for the each filtered signal for a series of sample periods;
    determining characteristic data for the data signal, by the processor, wherein the characteristic data for the data signal is determined based on the one or more peaks;
    extracting, by the processor, a digital thumbprint from the data signal based on content of the data signal, the digital thumbprint comprising the determined characteristic data for the data signal; and
    storing, by the processor, the digital thumbprint on a non-transitory computer-readable storage medium.

20. The non-transitory computer readable storage medium of claim 19, further comprising instructions for calculating, by the processor, the average total power for the each filtered signal for the series of sample periods.

* * * * *